(12) United States Patent
Uchiyama et al.

(10) Patent No.: US 10,078,189 B2
(45) Date of Patent: Sep. 18, 2018

(54) OPTICAL MODULE

(71) Applicants: FUJITSU COMPONENT LIMITED, Tokyo (JP); FUJITSU LIMITED, Kawasaki-shi, Kanagawa (JP)

(72) Inventors: Takuya Uchiyama, Tokyo (JP); Shinichiro Akieda, Tokyo (JP); Mariko Kase, Kawasaki (JP)

(73) Assignees: FUJITSU COMPONENT LIMITED, Tokyo (JP); FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/635,610

(22) Filed: Jun. 28, 2017

(65) Prior Publication Data

US 2018/0011264 A1    Jan. 11, 2018

(30) Foreign Application Priority Data

Jul. 11, 2016   (JP) .................................. 2016-136641

(51) Int. Cl.
*G02B 6/42* (2006.01)
*G02B 6/43* (2006.01)
*G02B 6/32* (2006.01)

(52) U.S. Cl.
CPC ............. *G02B 6/4206* (2013.01); *G02B 6/32* (2013.01); *G02B 6/4204* (2013.01); *G02B 6/428* (2013.01); *G02B 6/4214* (2013.01); *G02B 6/4239* (2013.01); *G02B 6/4246* (2013.01)

(58) Field of Classification Search
None
See application file for complete search history.

(56) References Cited

U.S. PATENT DOCUMENTS

| 7,456,483 | B2 | 11/2008 | Tsukamoto et al. |
| 8,774,576 | B2 | 7/2014 | Shiraishi |
| 8,827,572 | B2* | 9/2014 | Zhou .................... G02B 6/4206 385/31 |
| 9,442,251 | B2 | 9/2016 | Sakai et al. |
| 2005/0041906 | A1* | 2/2005 | Sugama ............. G02B 6/12002 385/14 |
| 2011/0317958 | A1* | 12/2011 | Nadeau ................ G02B 6/4256 385/14 |

(Continued)

FOREIGN PATENT DOCUMENTS

| JP | 2005-322809 | 11/2005 |
| JP | 2012-068539 | 4/2012 |

(Continued)

*Primary Examiner* — Michelle R Connelly
(74) *Attorney, Agent, or Firm* — IPUSA, PLLC (57) ABSTRACT

An optical module includes a lens sheet having one or more lenses, a substrate having a photoelectric conversion device mounted on a first face thereof and having a first penetrating hole formed therethrough between the photoelectric conversion device and the one or more lenses, and an adhesive layer configured to bond a face of the lens sheet to a second face of the substrate, wherein the adhesive layer has a second penetrating hole formed therethrough between the one or more lenses and the photoelectric conversion device, and a pathway is provided to connect a space constituted by the first penetrating hole and the second penetrating hole to an outside of the space.

5 Claims, 10 Drawing Sheets

(56) References Cited

U.S. PATENT DOCUMENTS

| | | | | |
|---|---|---|---|---|
| 2013/0315543 | A1* | 11/2013 | Tseng | G02B 6/43 |
| | | | | 385/88 |
| 2014/0140657 | A1* | 5/2014 | Shiraishi | G02B 6/42 |
| | | | | 385/14 |
| 2014/0290850 | A1* | 10/2014 | Yamakami | G02B 6/4204 |
| | | | | 156/275.5 |
| 2015/0212285 | A1* | 7/2015 | Kainuma | G01J 1/0407 |
| | | | | 250/214 A |
| 2016/0341903 | A1* | 11/2016 | Tang | G02B 6/32 |
| 2016/0349469 | A1* | 12/2016 | Kase | G02B 6/4206 |
| 2017/0068056 | A1* | 3/2017 | Gappa | G02B 6/422 |
| 2017/0068057 | A1* | 3/2017 | Fiebig | G02B 6/4214 |

FOREIGN PATENT DOCUMENTS

| | | | | |
|---|---|---|---|---|
| JP | 2014164198 A | * | 9/2014 | G02B 6/4206 |
| JP | 2015141300 A | * | 8/2015 | G01J 1/0407 |
| WO | 2013/105470 | | 7/2013 | |

* cited by examiner

AREA TO WHICH LENS SHEET 30 IS BOUNDED

AREA TO WHICH LENS SHEET 30 IS BOUNDED

OPTICAL MODULE

BACKGROUND OF THE INVENTION

1. Field of the Invention

The disclosures herein relate to an optical module.

2. Description of the Related Art

High-speed interface for supercomputers and high-end servers has been increasingly employing optical communications because of their capacity to achieve high-speed signal transmission and to increase transmission distance.

Next generation interface employs optical communications because of the need for a long transmission distance such as a few dozen meters, and uses optical connectors for converting between electrical signals and optical signals. Optical connectors, which are used to couple optical cables to servers or the like, convert optical signals from optical cables into electrical signals for outputting to servers, and also convert electrical signals from servers into optical signals for outputting to optical cables.

Such optical connectors have a light emitting device for converting an electrical signal into an optical signal, a light receiving device for converting an optical signal into an electrical signal, and an optical module containing an optical waveguide. For the purpose of allowing low-cost manufacturing, a certain type of optical module known in the art is made by bonding, with adhesive sheets, a sheet optical waveguide, a lens sheet, and a substrate having a light emitting device and a light receiving device mounted thereon.

In an optical module, the area where light paths are provided between a lens sheet and either a light emitting device or a light receiving device is an empty space.

Such an optical module may have dew condensation developing in the space when ambient temperature is low. Dew condensation developing between the lens sheet and the light emitting device or the light receiving device may cause water droplets of the dew condensation to be attached to the lenses or to the surface of the light emitting device and the light receiving device. In such a case, the concentration characteristics of lenses and/or the direction of light paths may change, so that the amount of light condensed by the lenses and entering the light receiving device is not sufficient, and/or the amount of light emitted by the light emitting device and entering the lenses is not sufficient, resulting in the performance of the optical module being lowered.

It may thus be desired to provide an optical module that does not sustain dew condensation, and thus does not exhibit changes in characteristics even at low temperature.

RELATED-ART DOCUMENTS

Patent Document

[Patent Document 1] Japanese Patent Application Publication No. 2012-68539

[Patent Document 2] Japanese Patent Application Publication No. 2005-322809

[Patent Document 3] International Publication Pamphlet No. WO 2013/105470

SUMMARY OF THE INVENTION

It is a general object of the present invention to provide an optical module that substantially obviates one or more problems caused by the limitations and disadvantages of the related art.

According to an embodiment, an optical module includes a lens sheet having one or more lenses, a substrate having a photoelectric conversion device mounted on a first face thereof and having a first penetrating hole formed therethrough between the photoelectric conversion device and the one or more lenses, and an adhesive layer configured to bond a face of the lens sheet to a second face of the substrate, wherein the adhesive layer has a second penetrating hole formed therethrough between the one or more lenses and the photoelectric conversion device, and a pathway is provided to connect a space constituted by the first penetrating hole and the second penetrating hole to an outside of the space.

According to at least one embodiment, an optical module is capable of avoiding dew condensation in a space between a lens sheet and a light emitting device or a light receiving device, thereby preventing characteristics from changing even at low temperature.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments for implementing the invention will be described. The same members or the like are referred to by the same numerals, and a description thereof will be omitted.

First Embodiment

Generation of dew condensation in an optical module will be described first.

Figure 1A:
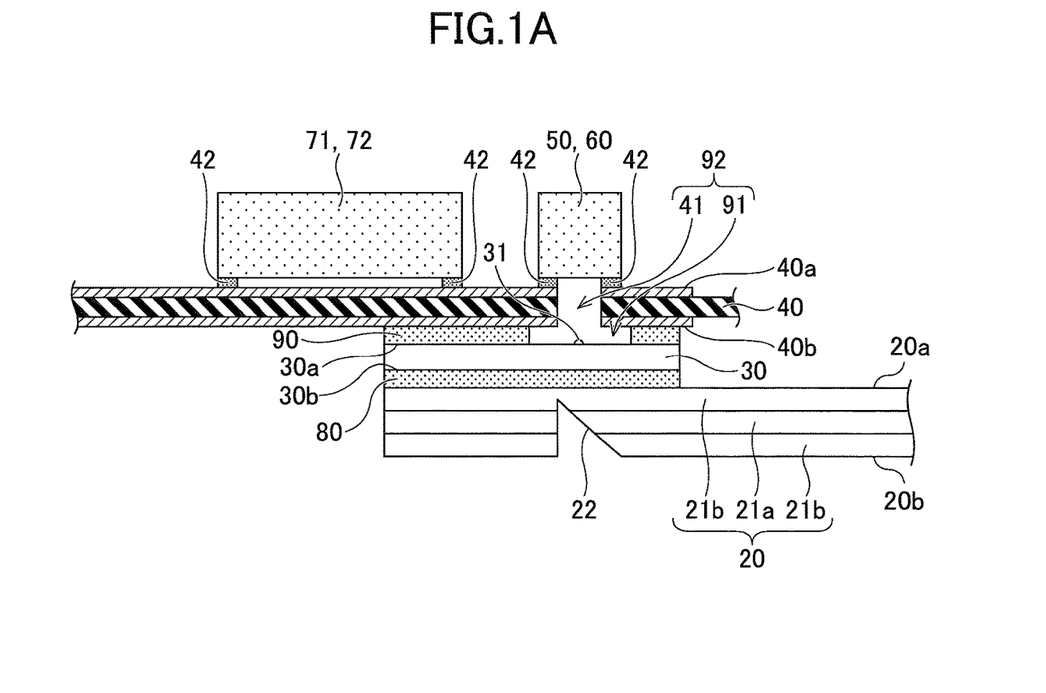
FIGS. 1A and 1B are drawings illustrating the structure of an optical module.
Figure 1B:
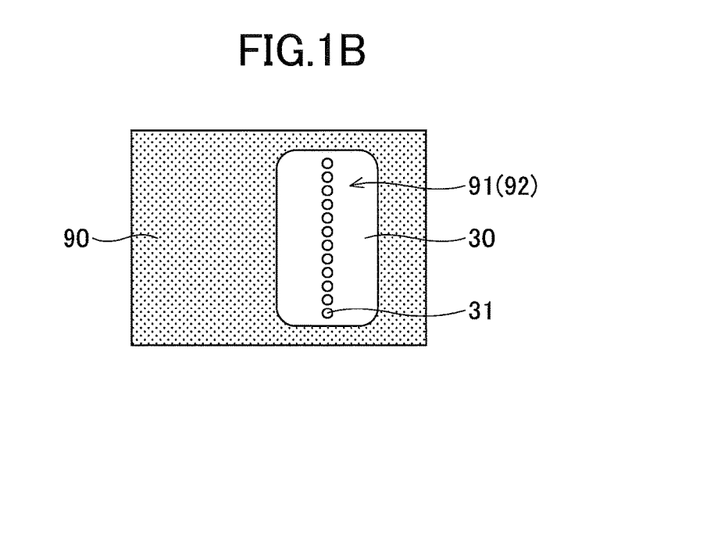

An optical module having a light emitting device and a light receiving device mounted on an optical waveguide includes a lens sheet 30 and a printed circuit board 40 (i.e., circuit substrate) stacked over an optical waveguide 20 as illustrated in FIGS. 1A and 1B. FIG. 1A is a cross-sectional view of the optical module. FIG. 1B is a top view of the lens sheet 30 to which an adhesive sheet 90 is attached.

The structure of the optical waveguide 20 is such that a core 21a disposed at the center is placed between, and covered with, clads 21b disposed on the opposite faces of the core 21a. The optical waveguide 20 has one end thereof coupled to a lens ferrule (not shown) and the other end thereof having a mirror 22 that is made by forming a triangular notch in the optical waveguide 20 from the direction of a face 20b. Lenses 31 are formed on a face 30a of the lens sheet 30. A face 20a of the optical waveguide 20 and a face 30b of the lens sheet 30 are bonded to each other via an adhesive sheet 80.

The printed circuit board 40 has conductive tracks (not shown) formed thereon. A face 40a of the printed circuit board 40 has a light emitting device 50, a light receiving device 60, a driver 71, and a TIA (trans-impedance amplifier) 72 mounted thereon. The light emitting device 50, which may be a VCSEL (vertical cavity surface emitting laser), has a plurality of light emitting points. The light receiving device 60, which may be a photodiode, has a plurality of light receiving points. The driver 71 is an IC (integrated circuit) for driving the light emitting device 50. The TIA 72 is an IC for converting electric current into voltage as the electric current is generated by the light receiving device 60 detecting light. In the disclosures herein, the light emitting device 50 and the light receiving device 60 may sometimes be referred to as a photoelectric conversion device.

The printed circuit board 40 has a penetrating hole 41 at the position of a light path for light emitted by the light emitting device 50 and for light entering the light receiving device 60. A face 30a of the lens sheet 30 and a face 40b of the printed circuit board 40 are bonded to each other via an adhesive sheet 90. The adhesive sheet 90 also has a penetrating hole 91 at the position of a light path for light emitted by the light emitting device 50 and for light entering the light receiving device 60. The light emitting device 50, the light receiving device 60, the driver 71, and the TIA 72 mounted on the face 40a of the printed circuit board 40 are electrically coupled to conductive tracks formed on the printed circuit board 40 via bumps 42. The bumps 42 are made of gold or the like. The adhesive sheets 80 and 90 may be a transparent double-sided tape.

The substrate and sheets of the optical module are bonded together such that the light emitting points of the light emitting device 50, the light receiving points of the light receiving device 60, the penetrating hole 41 of the printed circuit board 40, lenses 31 of the lens sheet 30, and the mirror 22 of the optical waveguide 20 are aligned with each other. Light emitted by the light emitting device 50 passes through the penetrating hole 41 of the printed circuit board 40 and lenses 31, and is reflected by the mirror 22 to enter the core 21a of the optical waveguide 20. Light traveling in the core 21a is reflected by the mirror 22, and passes through the lenses 31 and the penetrating hole 41 to enter the light receiving device 60. The respective components are aligned and bonded to each other to ensure such light paths.

In the optical module illustrated in FIG. 1, a space 92 constituted by the penetrating hole 41 of the printed circuit board 40 and the penetrating hole 91 of the adhesive sheet 90 is created between the lens sheet 30 and the light emitting device 50 or the light receiving device 60. The space 92 is hermetic. Driving ICs mounted on the optical module causes temperature to increase. A drop in the ambient temperature of the driving optical module thus causes dew condensation to occur due to moisture in the air inside the space 92. Water droplets created by dew condensation may adhere to the lenses 31 of the lens sheet 30, the light emitting device 50, and the light receiving device 60, which affects the concentration characteristics of the lenses 31 and the direction of light paths, resulting in the performance of the optical module being lowered.

Figure 2:
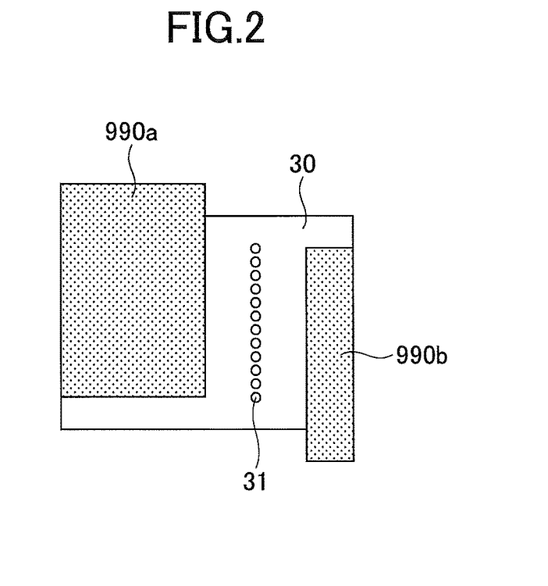
FIG. 2 is a drawing illustrating separate adhesive sheets.

As a measure to reduce dew condensation, two adhesive sheets 990a and 990b illustrated in FIG. 2 may be used in place of the adhesive sheet 90 illustrated in FIG. 1. However, the use of the two adhesive sheets 990a and 990b separate from each other leads to a reduced area size of the adhesive area, which may lower adhesiveness between the lens sheet 30 and the printed circuit board 40. In this arrangement, also, the aligning and bonding of the two adhesive sheets 990a and 990b are necessary, thereby increasing the number of production steps. Moreover, the aligning of the two adhesive sheets 990a and 990b is not easy, so that the two adhesive sheets 990a and 990b may be attached away from desired positions.

There may be thus a need to provide an optical module that is manufactured at low cost and that avoids dew condensation between the lens sheet 30 and the light emitting device 50 or the light receiving device 60.

<Optical Module>

Figure 3:
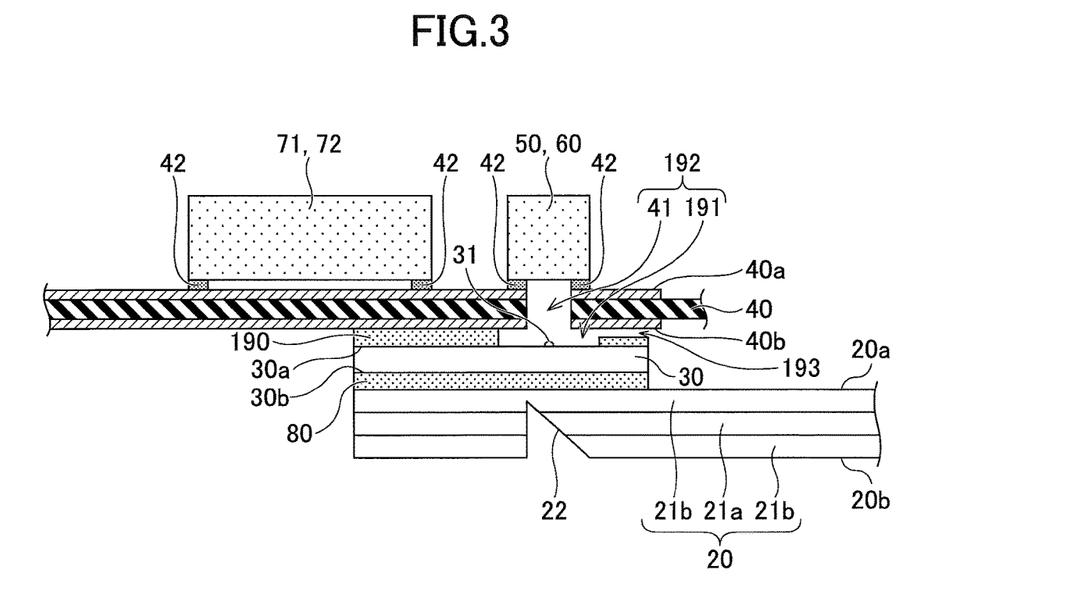
FIG. 3 is a cross-sectional view of an optical module of a first embodiment.
Figure 4A:
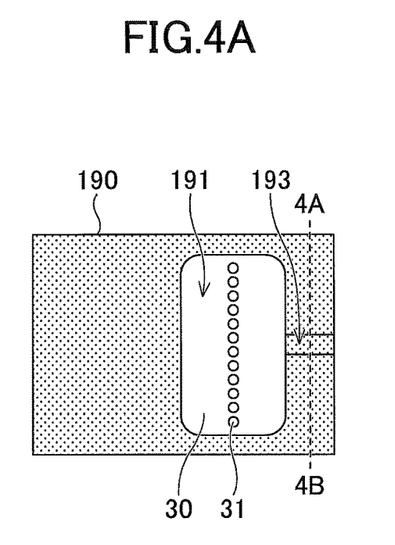
FIGS. 4A and 4B are drawings illustrating an adhesive sheet of the optical module of the first embodiment.
Figure 4B:
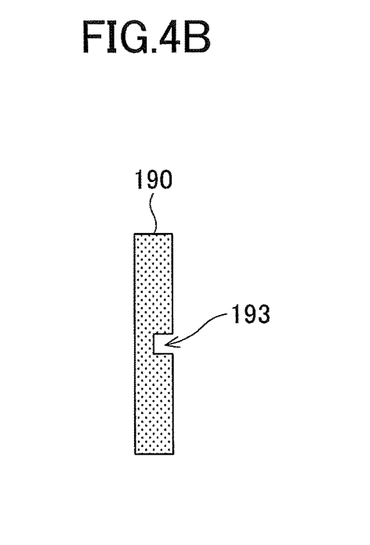

In the following, an optical module of the first embodiment will be described. The optical module of the present embodiment includes the lens sheet 30 and the printed circuit board 40 stacked over the sheet optical waveguide 20 as illustrated in FIG. 3 and FIGS. 4A and 4B. The lens sheet 30 and the printed circuit board 40 are bonded to each other via an adhesive sheet 190. The adhesive sheet 190 has a groove 193. FIG. 3 is a cross-sectional view of the optical module of the present embodiment. FIG. 4A is a top view of the lens sheet 30 to which the adhesive sheet 190 is bonded. FIG. 4B is a cross-sectional view of the adhesive sheet 190 taken along a dashed line 4A-4B in FIG. 4A. The adhesive sheet 190 may be referred to as an adhesive film or a first adhesive film. The adhesive sheet 80 may be referred to as a second adhesive film.

In the present embodiment, the face 30a of the lens sheet 30 and the face 40b of the printed circuit board 40 are bonded to each other via the adhesive sheet 190. The adhesive sheet 190 has a penetrating hole 191 at the position of a light path for light emitted by the light emitting points of the light emitting device 50 and for light entering the light receiving points of the light receiving device 60, and also has the groove 193 that connects the penetrating hole 191 and the outside of the adhesive sheet 190. The face having the groove 193 of the adhesive sheet 190 is bonded to the face 40b of the printed circuit board 40. The adhesive sheet 190, which may be a transparent double-sided tape, has adhesive layers on both faces.

In the optical module of the present embodiment, a space 192 constituted by the penetrating hole 41 of the printed circuit board 40 and the penetrating hole 191 of the adhesive sheet 190 is created between the lens sheet 30 and the light emitting device 50 or the light receiving device 60. The space 192 is not hermetic, and is in communication with the outside through the groove 193 formed in the adhesive sheet 190. Namely, the adhesive sheet 190 is not in contact with the face 40b of the printed circuit board 40 where the groove 193 is formed. With this arrangement, moisture inside the space 192 may escape to the outside of the space 192 through the groove 193 serving as an escape pathway.

According to the present embodiment described above, moisture inside the space 192 may escape to the outside of the space 192 through the groove 193, which prevents dew condensation from developing inside the space 192 even when the ambient temperature of the optical module drops. Consequently, no water droplets adhere to the lenses 31 of the lens sheet 30, the light emitting device 50, and the light receiving device 60. The performance of the optical module is thus not lowered. In the present embodiment, the groove of the adhesive sheet 190 may alternatively be formed on the face that is bonded to the face 30a of the lens sheet 30.

Figure 5:
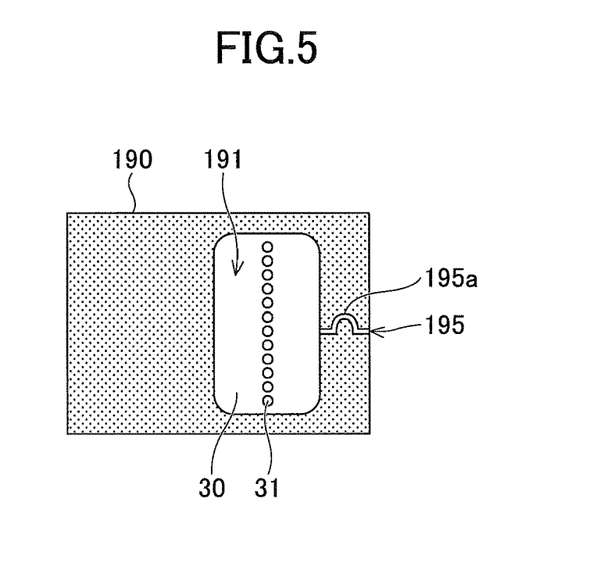
FIG. 5 is a drawing illustrating another adhesive sheet of the optical module of the first embodiment.

Moreover, a curved section 195a for preventing dusts or the like from entering the space 192 from the outside may be formed on a groove 195 of the adhesive sheet 190. The curved groove 195 reduces the likelihood of dust intrusion by use of the curved section 195a, compared with the case in which the straight groove 193 is formed.

Second Embodiment

Figure 6:
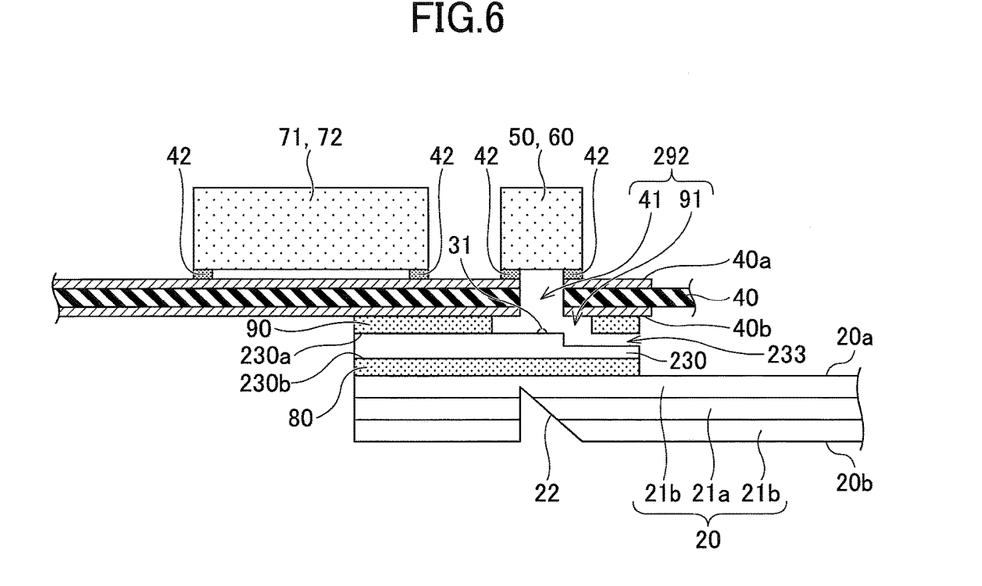
FIG. 6 is a cross-sectional view of an optical module of a second embodiment.
Figure 7A:
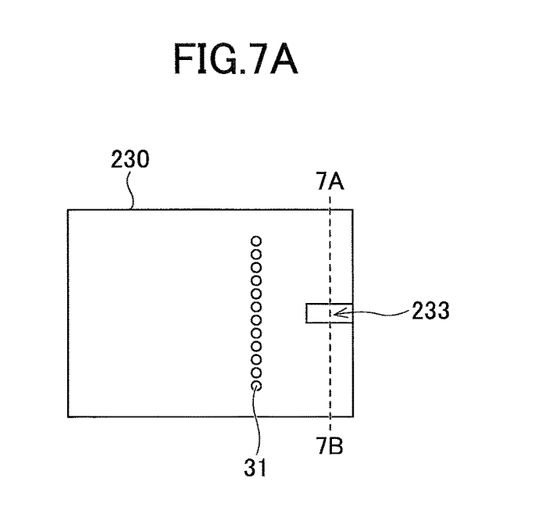
FIGS. 7A and 7B are drawings illustrating a lens sheet of the optical module of the second embodiment.
Figure 7B:
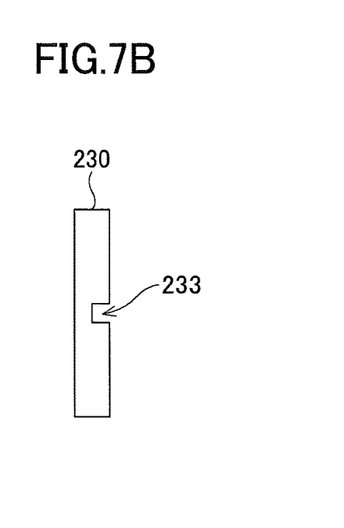

In the following, a second embodiment will be described. The second embodiment is directed to an optical module in which a lens sheet 230 has a groove 233 as illustrated in FIG. 6 and FIGS. 7A and 7B, rather than an adhesive sheet having a groove. The optical module according to the present embodiment will be described with reference to FIG. 6 and FIGS. 7A and 7B. FIG. 6 is a cross-sectional view of the optical module of the present embodiment. FIG. 7A is a top view of the lens sheet 230. FIG. 7B is a cross-sectional view of the lens sheet 230 taken along a dashed line 7A-7B in FIG. 7A.

The lens sheet 230 of the optical module of the present embodiment has a plurality of lenses 31 and the groove 233 on one face 230a thereof. The face 230a of the lens sheet 230 and the face 40b of the printed circuit board 40 are bonded to each other via the adhesive sheet 90. A face 230b of the lens sheet 230 and the face 20a of the optical waveguide 20 are bonded to each other via the adhesive sheet 80. The adhesive sheet 90 may be referred to as an adhesive film or a first adhesive film.

In the optical module of the present embodiment, a space 292 constituted by the penetrating hole 41 of the printed circuit board 40 and the penetrating hole 91 of the adhesive sheet 90 is created between the lens sheet 230 and the light emitting device 50 or the light receiving device 60. The space 292 is not hermetic, and is in communication with the outside through the groove 233 formed in the lens sheet 230. The portion of the lens sheet 230 where the groove 233 is formed is not in contact with the adhesive sheet 90, so that moisture inside the space 292 may escape to the outside of the space 292 through the groove 233.

Configurations other than those described above are the same as or similar to those of the first embodiment.

Third Embodiment

In the following, a third embodiment will be described. The third embodiment is directed to an optical module in which a printed circuit board 340 has a groove 343 as illustrated in FIG. 8 and FIGS. 9A through 9C, rather than an adhesive sheet or a lens sheet having a groove. The optical module according to the present embodiment will be described with reference to FIG. 8 and FIGS. 9A through 9C.

Figure 8:
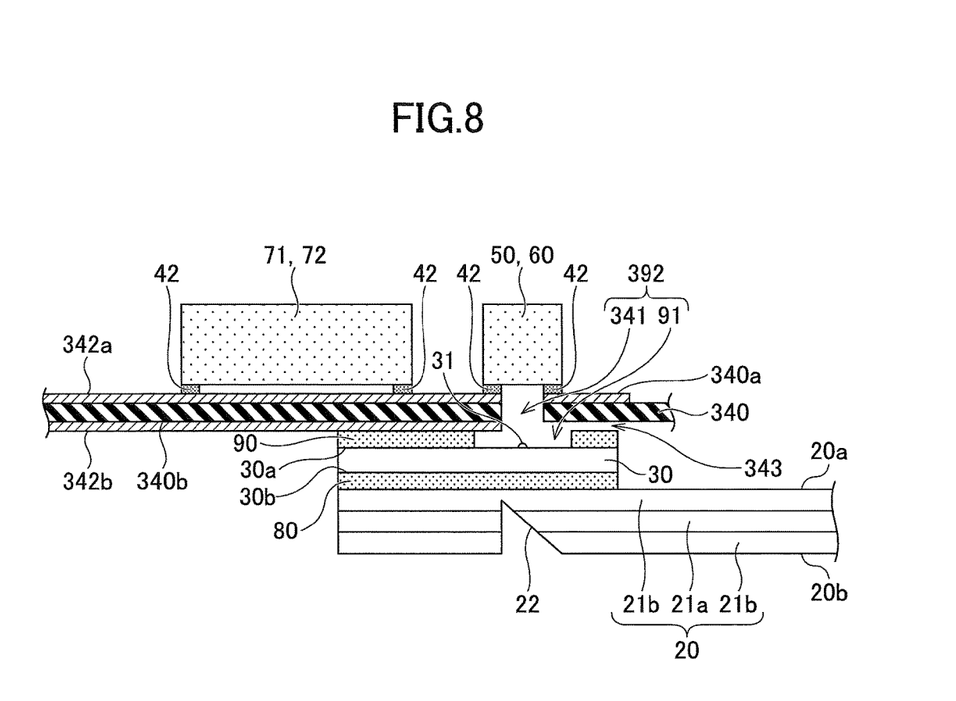
FIG. 8 is a cross-sectional view of an optical module of a third embodiment.
Figure 9A:
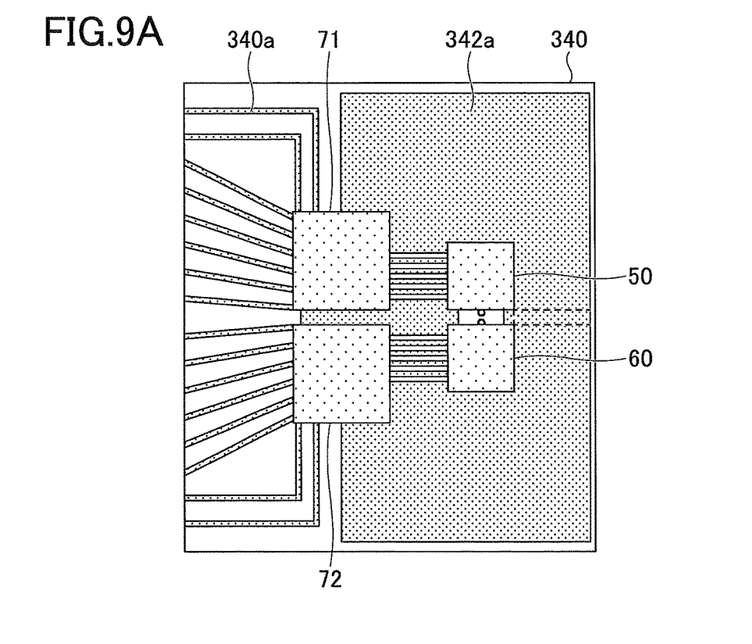
FIGS. 9A through 9C are drawings illustrating a printed circuit board of the optical module of the third embodiment.
Figure 9B:
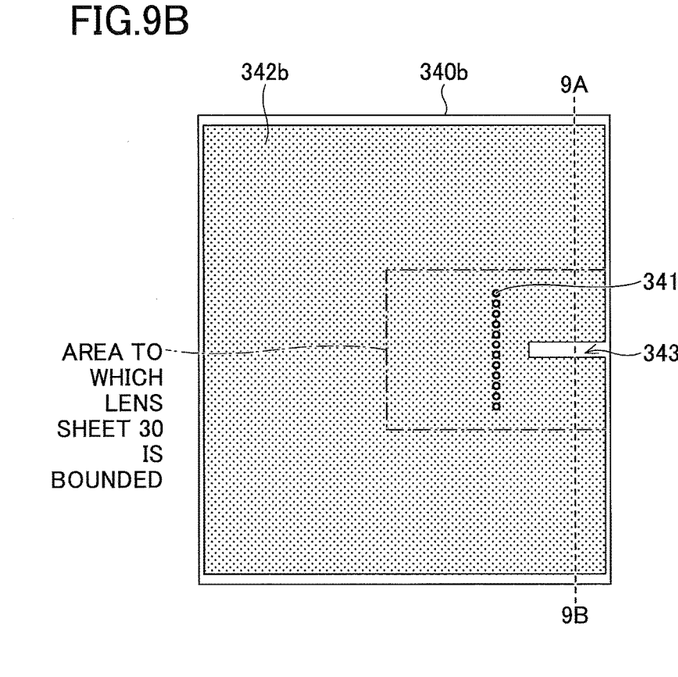
Figure 9C:
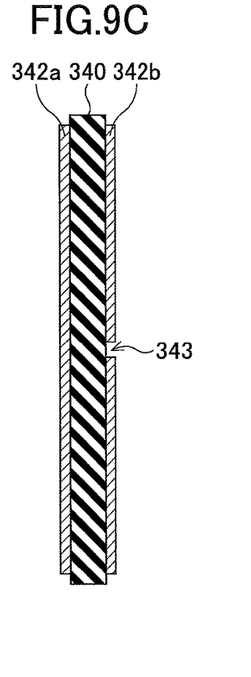

The printed circuit board 340 has a metal layer 342a formed on one face 340a thereof for providing conductive tracks and the like, and has a metal layer 342b on the other face 340b thereof for providing conductive tracks and the like. FIG. 8 is a cross-sectional view of the optical module of the present embodiment. FIG. 9A is a top view of the printed circuit board 340. FIG. 9B is a bottom view of the printed circuit board 340. FIG. 9C is a cross-sectional view of the printed circuit board 340 taken along a dashed line 9A-9B in FIG. 9B.

In the optical module of the present embodiment, the printed circuit board 340 has a penetrating hole 341 at the position of a light path for light emitted by the light emitting device 50 and for light entering the light receiving device 60. The area of the face 340b of the printed circuit board 340 where the lens sheet 30 is bonded has the groove 343 that is formed by removing part of the metal layer 342b. The face 30a of the lens sheet 30 and the face 340b of the printed circuit board 340 are bonded to each other via an adhesive sheet 90. The face 340a of the printed circuit board 340 has the light emitting device 50, the light receiving device 60, the driver 71, and the TIA 72 mounted thereon.

In the optical module of the present embodiment, a space 392 constituted by the penetrating hole 341 of the printed circuit board 340 and the penetrating hole 91 of the adhesive sheet 90 is created between the lens sheet 30 and the light emitting device 50 or the light receiving device 60. The space 92 is not hermetic, and is in communication with the outside through the groove 343 of the printed circuit board 340. The portion of the face 340b of the printed circuit board 340 where the groove 343 is formed is not in contact with the adhesive sheet 90, so that moisture inside the space 392 may escape to the outside of the space 392 through the groove 233.

Figure 10A:
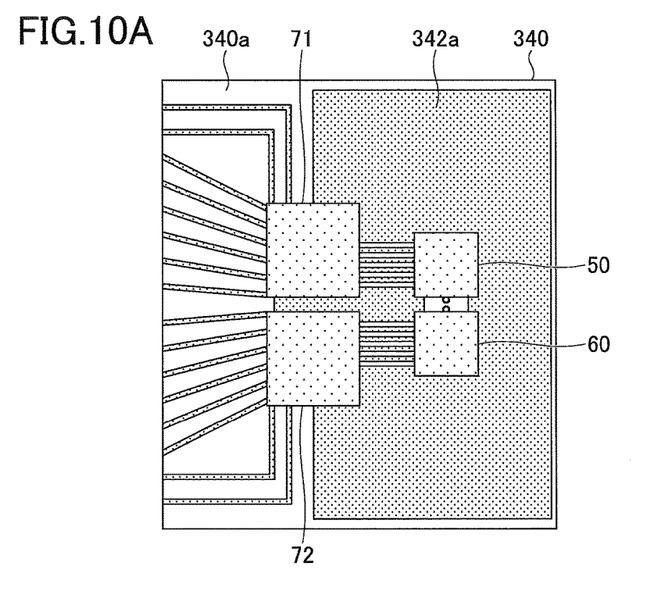
FIGS. 10A through 10C are drawings illustrating another printed circuit board of the optical module of the third embodiment.
Figure 10B:
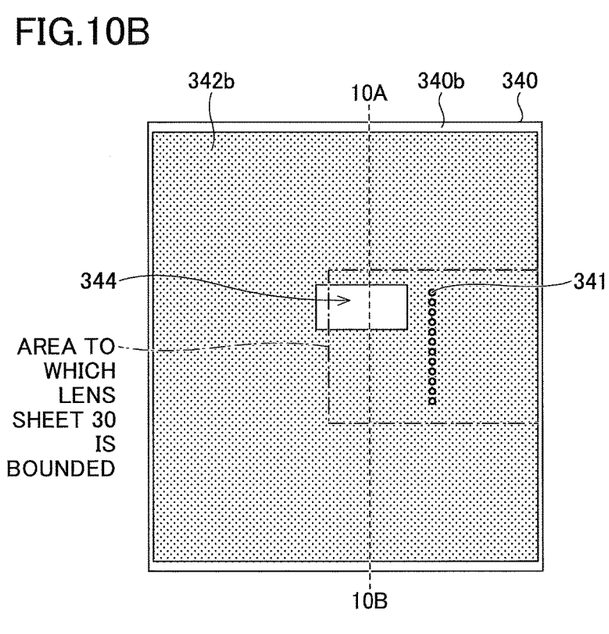
Figure 10C:
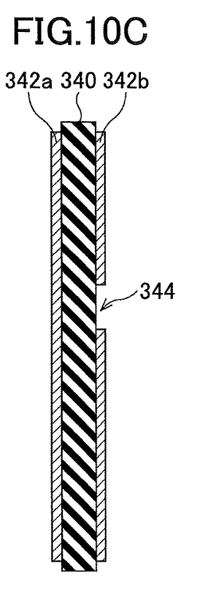

Alternatively, as illustrated in FIGS. 10A through 10C, part of the metal layer 342b may be removed in the area of the face 340b of the printed circuit board 340 where the lens sheet 30 is bonded, such that the removed area may be situated at the position corresponding to the conductive tracks formed in the metal layer 342a between the light receiving device 60 and the TIA 72. In this case, the metal layer 342b of the printed circuit board 340 is coupled to a ground potential, thereby serving as a ground electrode. In the present embodiment, part of the metal layer 342b serving as a ground electrode is removed at the same horizontal position as the conductive tracks between the light receiving device 60 and the TIA 72 to increase the inductance of the signal tracks, thereby improving frequency characteristic through inductor peaking. Accordingly, the provision of the groove 344 serves both to prevent dew condensation and to improve the frequency characteristics of the optical module.

It may be noted that the groove 344 is formed such as to extend beyond the area where the lens sheet is bonded.

Configurations other than those described above are the same as or similar to those of the first embodiment.

Fourth Embodiment

In the following, a fourth embodiment will be described. The fourth embodiment is directed to the configuration in which an adhesive sheet has an uneven surface.

Figure 11A:
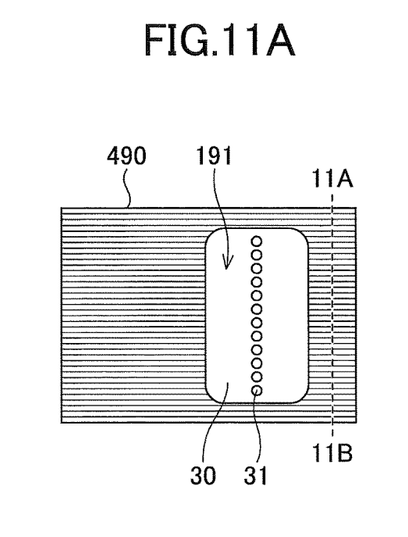
FIGS. 11A and 11B are drawings illustrating an adhesive sheet of the optical module of a fourth embodiment.
Figure 11B:
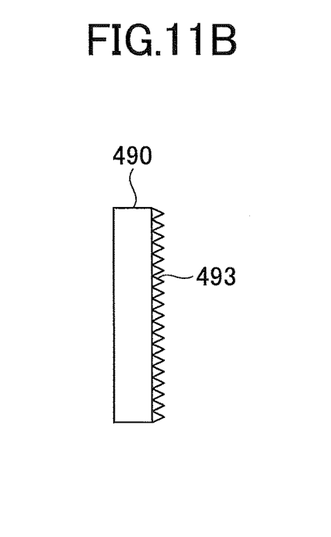

In the optical module of the present embodiment, one face of an adhesive sheet 490 has straight-line ridges and furrows 493 formed therein as illustrated in FIGS. 11A and 11B. FIG. 11A is a top view of the adhesive sheet 490 bonded to the lens sheet 30. FIG. 11B is a cross-sectional view of the adhesive sheet 490 taken along a dashed line 11A-11B in FIG. 11A.

The provision of the straight-line ridges and furrows 493 in the surface of the adhesive sheet 490 creates gaps between the printed circuit board 40 and the face of the adhesive sheet 490 having the ridges and furrows 493. Specifically, mounting the printed circuit board 40 on the adhesive sheet 490 causes the ridge portions of the ridges and furrows 493 to come in contact with the printed circuit board 40, without the furrow portions of the ridges and furrows 493 coming in contact with the printed circuit board 40. This creates gaps between the printed circuit board 40 and the furrow portions of the ridges and furrows 493. The space 192 is thus connected to the outside through these gaps without the provision of a structured groove formed in the adhesive sheet.

Figure 12A:
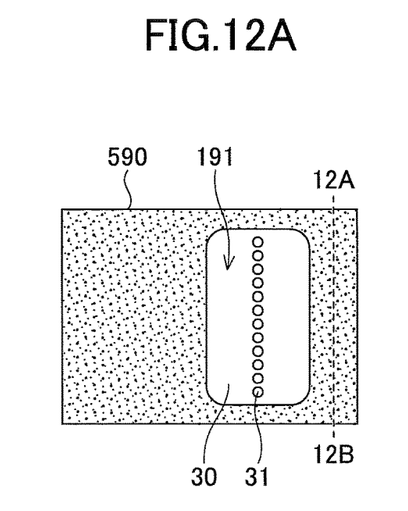
FIGS. 12A and 12B are drawings illustrating another adhesive sheet of the optical module of the fourth embodiment.
Figure 12B:
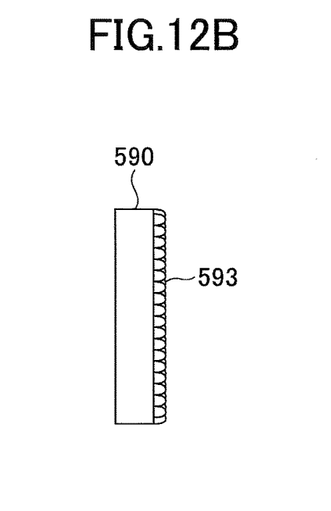

As illustrated in FIGS. 12A and 12B, an adhesive sheet 590 may have random bumps 593 formed on the surface thereof. This arrangement brings about the same or similar results and effects as in the case of FIGS. 11A and 11B. FIG. 12A is a top view of the adhesive sheet 590. FIG. 12B is a cross-sectional view of the adhesive sheet 590 taken along a dashed line 12A and 12B in FIG. 12A.

Configurations other than those described above are the same as or similar to those of the first embodiment.

Fifth Embodiment

In the following, a fifth embodiment will be described. The fifth embodiment is directed to the configuration in which the lens sheet has an uneven surface.

Figure 13A:
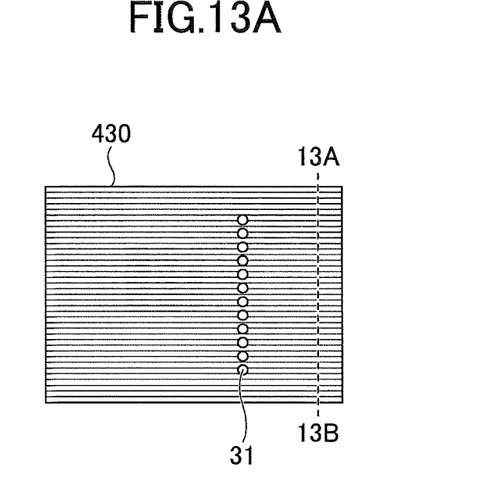
FIGS. 13A and 13B are drawings illustrating a lens sheet of the optical module of a fifth embodiment.
Figure 13B:
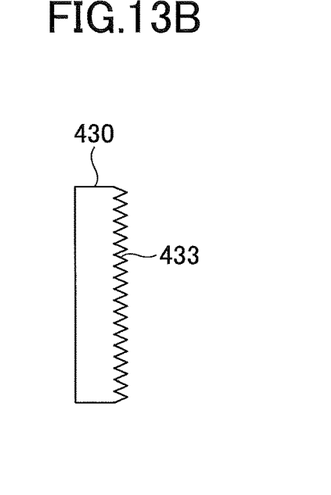

In the optical module of the present embodiment, one face of a lens sheet 430 has straight-line ridges and furrows 433 formed therein as illustrated in FIGS. 13A and 13B. FIG. 13A is a top view of the lens sheet 430. FIG. 13B is a cross-sectional view of the lens sheet 430 taken along a dashed line 13A and 13B in FIG. 13A.

The provision of the straight-line ridges and furrows 433 in the surface of the lens sheet 430 creates gaps between the adhesive sheet 90 and the face of the lens sheet 430 having the ridges and furrows 433. Mounting the adhesive sheet 90 on the lens sheet 430 causes the ridge portions of the ridges and furrows 433 to come in contact with the adhesive sheet 90, without the furrow portions of the ridges and furrows 433 coming in contact with the adhesive sheet 90. This creates gaps between the adhesive sheet 90 and the furrow portions of the ridges and furrows 433. Accordingly, the space 292 is connected to the outside through the gaps between the furrow portions and the adhesive sheet 90, without the provision of a structured groove formed in the lens sheet.

Figure 14A:
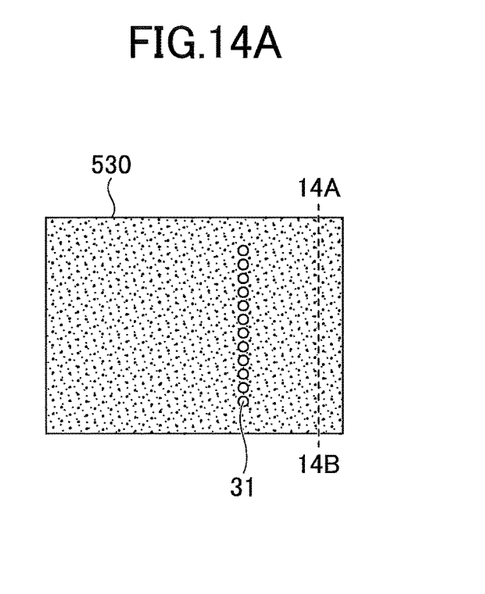
FIGS. 14A and 14B are drawings illustrating another lens sheet of the optical module of the fifth embodiment.
Figure 14B:
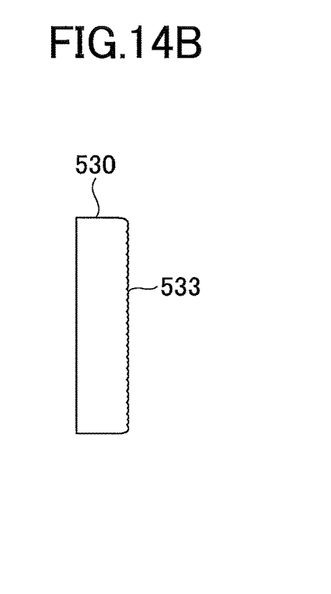

As illustrated in FIGS. 14A and 14B, a lens sheet 530 may have random bumps 533 formed on the surface thereof. This arrangement brings about the same or similar results and effects as in the case of FIGS. 13A and 13B. FIG. 14A is a top view of the lens sheet 530. FIG. 14B is a cross-sectional view of the lens sheet 530 taken along a dashed line 14A and 14B in FIG. 14A.

Configurations other than those described above are the same as or similar to those of the second embodiment.

Sixth Embodiment

In the following, a sixth embodiment will be described. The sixth embodiment is directed to the configuration in which the printed circuit board has an uneven surface.

Figure 15A:
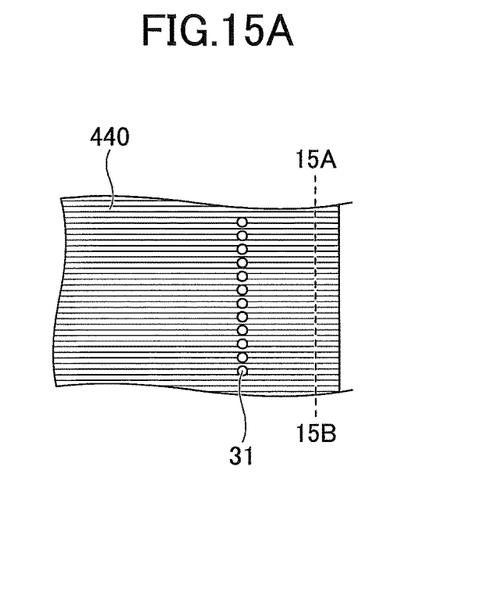
FIGS. 15A and 15B are drawings illustrating a printed circuit board of the optical module of a sixth embodiment.
Figure 15B:
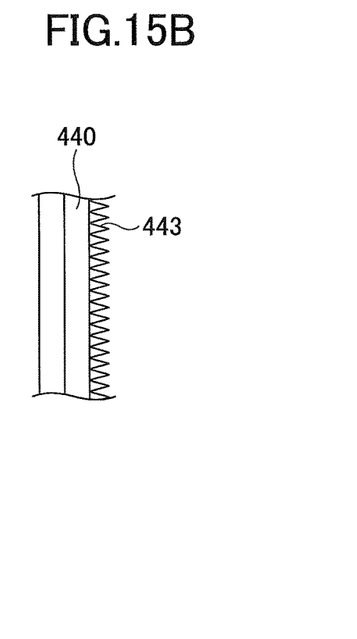

In the optical module of the present embodiment, one face of a printed circuit board 440 has straight-line ridges and furrows 443 formed therein as illustrated in FIGS. 15A and 15B. FIG. 15A is a bottom view of the printed circuit board 440. FIG. 15B is a cross-sectional view of the printed circuit board 440 taken along a dashed line 15A and 15B in FIG. 15A.

The provision of the straight-line ridges and furrows 433 in the surface of the printed circuit board 440 creates gaps between the adhesive sheet 90 and the face of the printed circuit board 440 having the ridges and furrows 443. Mounting the printed circuit board 440 on the adhesive sheet 90 causes the ridge portions of the ridges and furrows 443 to come in contact with the adhesive sheet 90, without the furrow portions coming in contact with the adhesive sheet 90. This creates gaps between the adhesive sheet 90 and the furrow portions of the ridges and furrows 433. Accordingly, the space 392 is connected to the outside through the gaps between the furrow portions and the adhesive sheet 90, without the provision of a structured groove formed in the printed circuit board.

Figure 16A:
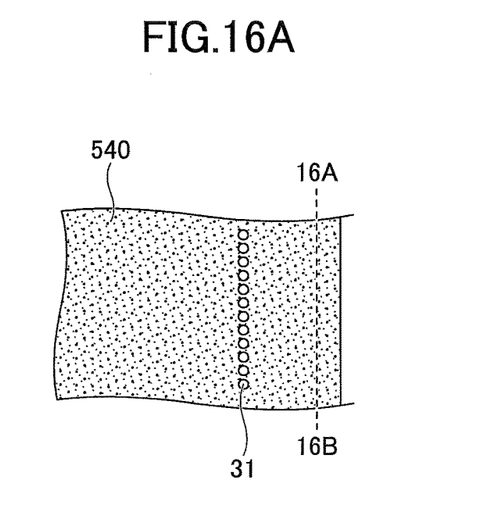
FIGS. 16A and 16B are drawings illustrating another printed circuit board of the optical module of the sixth embodiment.
Figure 16B:
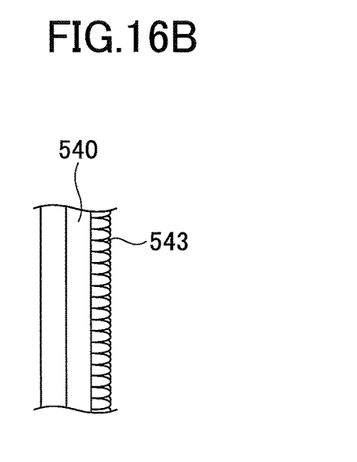

As illustrated in FIGS. 16A and 16B, a printed circuit board 540 may have random bumps 543 formed on the surface thereof. This arrangement also brings about the same or similar results and effects as in the case of FIGS. 15A and 15B. FIG. 16A is a bottom view of the printed circuit board 540. FIG. 16B is a cross-sectional view of the printed circuit board 540 taken along a dashed line 16A and 16B in FIG. 16A.

Configurations other than those described above are the same as or similar to those of the third embodiment.

Further, although a description has been given with respect to one or more embodiments of the present invention, the contents of such a description do not limit the scope of the invention.

The present application is based on and claims the benefit of priority of Japanese priority application No. 2016-136641 filed on Jul. 11, 2016, with the Japanese Patent Office, the entire contents of which are hereby incorporated by reference.

What is claimed is:

1. An optical module, comprising:
   a lens sheet having one or more lenses formed thereon;
   a substrate having a photoelectric conversion device mounted on a first face thereof and having a first penetrating hole formed therethrough between the photoelectric conversion device and the one or more lenses; and
   an adhesive layer configured to bond a face of the lens sheet to a second face of the substrate,
   wherein the adhesive layer has a second penetrating hole formed therethrough between the one or more lenses and the photoelectric conversion device, and a pathway is provided to connect a space constituted by the first penetrating hole and the second penetrating hole to an outside of the space, wherein an outer perimeter, below the one or more lenses, of the lens sheet encompasses an entirety of the second penetrating hole in a plan view as viewed in a thickness direction of the lens sheet, and wherein an outer perimeter of the adhesive layer encompasses an entirety of the second penetrating hole in the plan view, and the pathway extends along or in the adhesive layer to connect the second penetrating hole to an outside of the outer perimeter of the adhesive layer in the plan view.

2. The optical module as claimed in claim 1, wherein the pathway is formed in the adhesive layer.

3. The optical module as claimed in claim 1, wherein the pathway is formed in the lens sheet.

4. The optical module as claimed in claim 1, wherein the pathway is formed in the substrate.

5. The optical module as claimed in claim 1, further comprising:
- an optical waveguide having a mirror formed thereon; and
- a second adhesive layer configured to bond a face of the optical waveguide to another face of the lens sheet.

* * * * *